Fig. 4.
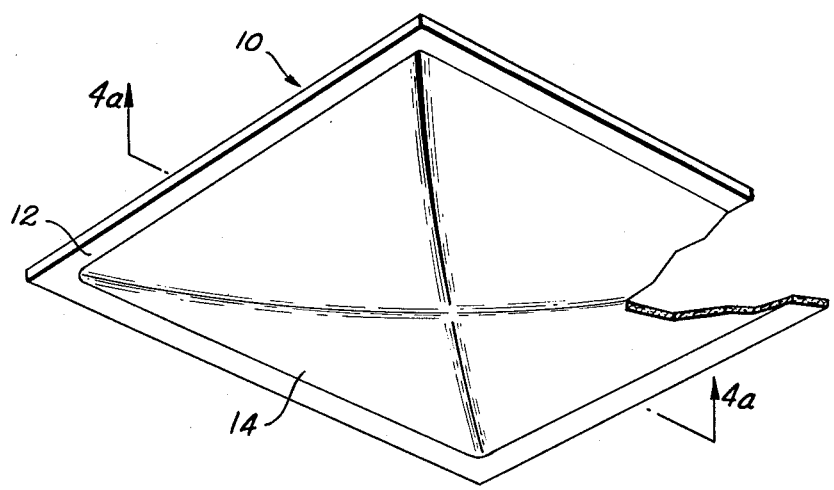
Fig. 4a
Fig. 5
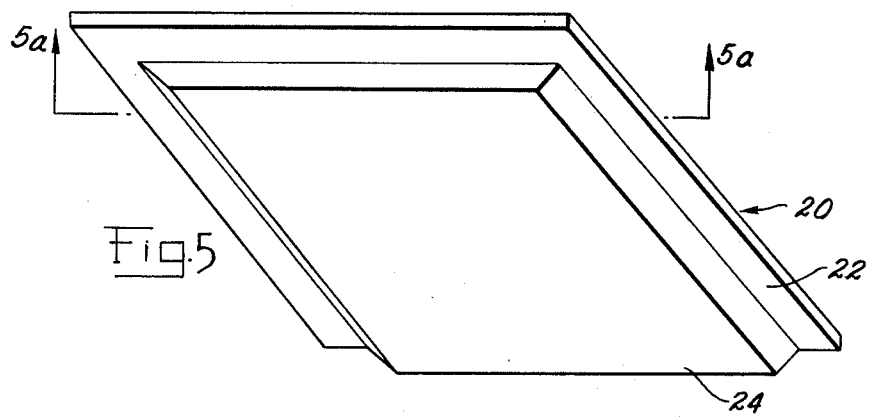
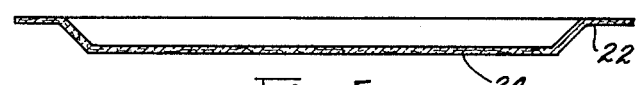
Fig. 5a
INVENTORS
GEORGE J. HANNES
WILLIAM P. HAHN
BY
ATTORNEY United States Patent Office 3,239,973
Patented Mar. 15, 1966

3,239,973
ACOUSTICAL GLASS FIBER PANEL WITH DIAPHRAGM ACTION AND CONTROLLED FLOW RESISTANCE
George J. Hannes, Maumee, and William P. Hahn, Toledo, Ohio, assignors to Johns-Manville Corporation, New York, N.Y., a corporation of New York
Filed Jan. 24, 1964, Ser. No. 340,035
18 Claims. (Cl. 52—144)

This invention relates to acoustical panels and surfacing units, and to the method of manufacturing them. More specifically, this invention relates to a uniquely thin, coated glass fiber panel characterized by good acoustical and physical properties, and further characterized by good economical and practical considerations.

Mats, sheets, and similar panels formed of compressed mineral fibers, and particularly glass fibers, have demonstrated significant advantages as acoustical materials. Such structures are useful in view of their acoustical absorbing or sound dampening characteristics, and are generally formed by compressing to a suitable density and thickness a mass of randomly arranged fibers bonded together at their intersections by a binder which serves to retain the fibers in the desired relationship. In certain applications surfacing effects have been achieved to impart decorative features to the panel. These sheets have generally been flat rectangular shapes.

Inasmuch as the sound absorbing characteristics of the fibrous mass are dependent upon a rather complicated relationship of the properties of the mass, and particularly the flow resistance of the mass, it has heretofore been believed that a minimum thickness of at least ½ inch, coupled with a density between 8 and 12 pounds per cu. ft., was necessary for commercially acceptable panels This was believed particularly true as the panel was often used in suspension systems whereby the panel would be placed between suspended T-bars and would deflect in use if the panel did not have sufficient stiffness. For this reason many attempts were made to provide relatively thick pads which would span the distance between adjacent T-bars without appreciable deflection. U.S. Letters Patents Nos. 2,962,385 to Reese et al. and 2,984,312 to Brisley et al. are illustrative of such prior art. The commercial acceptability of the panel is dependent, however, upon the cost, and in view of the large amount of fibers thought necessary to provide functional panels, the art has been faced with a difficult task of providing a more economical product while maintaining the desired acoustical and aesthetical properties.

It is therefore a principal object of this invention to provide a glass fiber acoustical panel characterized by all the heretofore desirable acoustical properties while being manufactured in a more economical and practical manner.

It is a further object of this invention to provide a more economical ceiling panel, in terms of thinner cross-section, but possessed of good acoustical properties and physical properties in terms of limited deflection in suspended ceiling construction or the like.

It is another object of the instant invention to provide a method of manufacturing such glass fiber acoustical tiles whereby the physical and acoustical properties of glass fiber tiles would be improved.

It is a further object of the instant invention to provide a glass fiber surfacing unit or tile having good acoustical or sound attenuating properties provided with an attractive or decorative surface.

Still another object of the instant invention is the provision of a method for preparing a glass fiber acoustical tile mentioned in the above objects whereby a decorative finish could be achieved upon such a tile without materially imparing the acoustical characteristics of the surfacing sheet.

Further objects and applicability of the instant invention will become more apparent from the detailed description given hereinafter, taken with the accompanying drawing, wherein.

FIGURES 4 and 4a are a perspective view and a cross-sectional view taken along the line 4a—4a of FIGURE 4, respectively, of one embodiment of a three dimensional shaped ceiling panel of the instant invention; and FIGURES 5 and 5a are a perspective view and a cross-sectional view taken along line 5a—5a of FIGURE 5, respectively, of a second three dimensional shaped ceiling panel of the instant invention.

Figure 6:
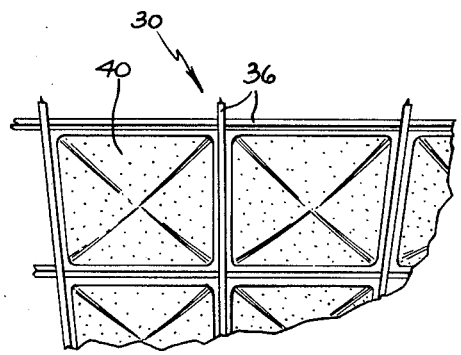

FIGURE 6 is a bottom perspective view of a plurality of the inventive ceiling panels mounted in a preferred form of supported ceiling structure.

The foregoing problems have been overcome and the above objects satisfied by the adoption and modification of certain structural concepts. More specifically, acoustical ceiling panels and similar structures may be produced in thin cross-section without objectionable deflection by controlling the density, thickness, and moment of inertia of the panel within limits to permit stress diaphragm action to be invoked during normal deflection. That is, as stated by Seely and Smith in their book "Advanced Mechanics of Materials" (2nd edition, John Wiley and Sons, Inc., 1959), for some flat plates, which are relatively thin, a maximum deflection which is equal to several thicknesses of the plate may still be relatively small as compared to other dimensions of the plate or compared to the acceptable or allowable deflection. Furthermore, the maximum stresses in thin plates subjected to such relatively large deflections may still be within the elastic strength of the material. Under these conditions the resistance of the plate to loads is greatly increased by the direct tensile stresses which begin to have a significant influence in resisting the loads in addition to the bending stresses when the maximum deflection exceeds about ½ the thickness of the plate. This phenomenon has been termed stress diaphragm.

In many applications of flat plates, especially for relatively thin plates, maximum deflection equal to several thicknesses of the plate may be permitted without causing interference with the structural use of the plate. While there have been offered several criteria for acceptable deflection of structural members, 1/240 of the shorter span distance, $a$, or $a/240$, is the more applicable and acceptable value for ceiling panels. Practical considerations such as quality control fix a lower thickness limit of about 0.1 inch. Therefore, assuming a nominal 2 ft. x 2 ft. flat panel, the allowable deflection limit is 1/240 of 24 inches or 0.10 inch. Consequently, in order to invoke stress diaphragm action, the total thickness of the panel must be less than twice this acceptable deflection, or 0.2 inch. While a criteria of 1/240 of the shorter span will be used herein and in the examples, it should be noted that criteria have ranged from 1/180 to 1/360, and such are considered within the scope of this invention. As it is necessary to have deflection to invoke stress diaphragm, and some deflection will occur with all plates in suspended conditions, the control of the deflection and hence the promotion of stress diaphragm is dependent upon the weight per unit area, W, and the modulus of elasticity, E, both of which are functions of the density of the material.

Since the industry is dually concerned with both structural and ascoustical properties, it is also necessary to take into account any physical restrictions necessary to achieve minimum or desirable acoustical effects. Acoustical qualities are generally recognized in terms of the noise reduction coefficient, NRC, of the panel and an average between 60 and 80 is acknowledged as good. It has been discovered, as will be more fully explained hereinafter, in panels less than 0.4 inch thick, these NRC values are achieved when the flow resistance values are between 0.8 and $5\rho c$ units and preferably of 1.5 to $4\rho c$ units, wherein one $\rho c$ unit is understood, in the art, as the density of air times the velocity of sound in air, which in the c.g.s. system equals $$g./cm.^3 \times \frac{cm.}{sec.}$$

or g/cm.²-sec. This is represented graphically in FIGURE 1. An empirical equation for determining the flow resistance, FR, of a panel, $t$ inches thick, is $$FR = \frac{W^2}{12,800t}$$

Thus the weight per unit area, W, may be expressed as equal to $\sqrt{12,800(t)FR}$, where FR varies between 1.5 and $4\rho c$ units. Using an average value of $2.0\rho c$ units, and a thickness of 0.1–0.4 inch, the equation solves to give a weight per unit area of between 55 and 170 grams per square foot of panel.

Coupling these limitations with the above determined thickness limitations, this provides a density range for the panel of about 10 to about 15 pounds per cu. ft. For this density range of glass fiber mats, the average reported modulus of elasticity (E) varies between $1 \times 10^4$ and $10 \times 10^4$ and is averaged at approximately $4 \times 10^4$ p.s.i.

Consequently, it has been determined, that the following procedure may be employed to design an acoustical fiber glass panel of thin cross section:

(1) Select a thickness, $t$, for a span $a \times b$, which varies between 0.1 inch and 2 ($\frac{1}{180}$) $a$ or $a/90$, where $a$ is the shorter linear dimension of the tile to be used;

(2) Based on the selected thickness $t$, compute the pressure factor, $$\frac{Wc^5}{6EIt}$$

where W is as expressed above, $\sqrt{12,800(t)FR}$; $c$ is $a/2$; E is the modulus of elasticity of glass fiber mats, and an average of about $4 \times 10^4$ p.s.i.; and I is the moment of inertia, and for a flat plate $bt^3/12$;

(3) From the calculation of the pressure factor, read the deflection ratio, $\Delta/t$, from curve A (FIG. 3), which is based on $a/b=1$ but approximate for all other ratios of $a/b$.

Figure 3:
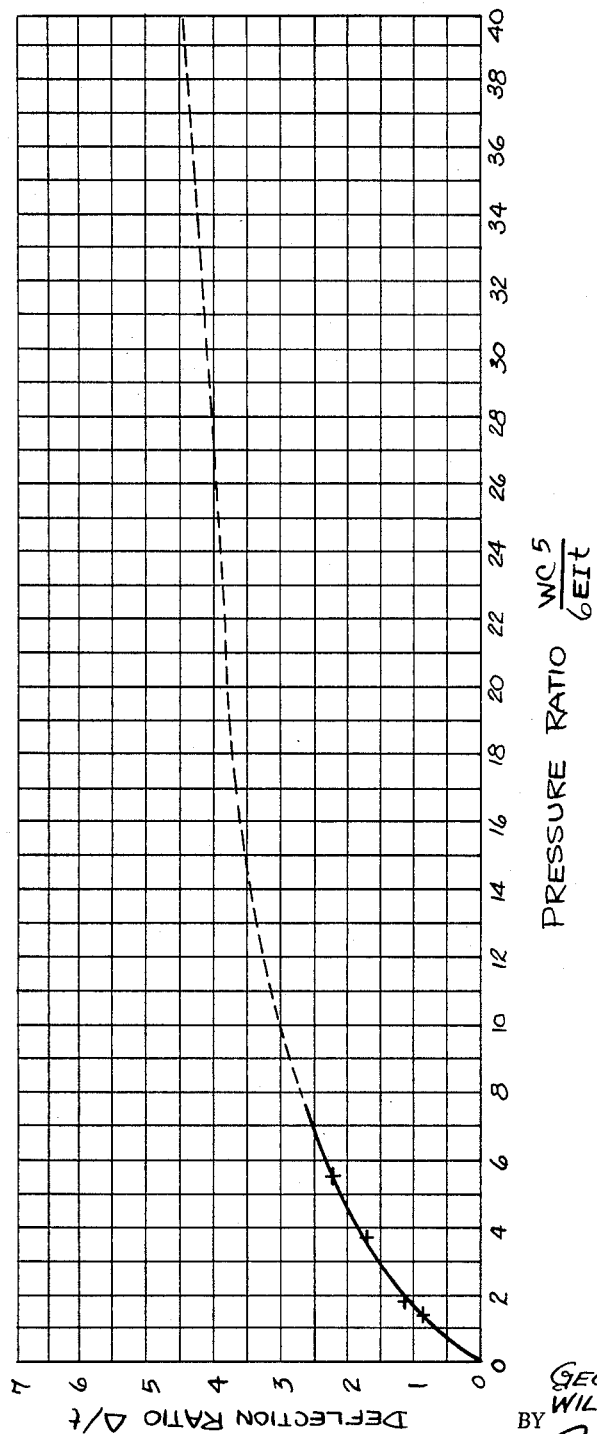
FIGURE 3 is a curve (A) representing center deflection against pressure for freely supported plates, using a Poisson's ratio of 0.3 and based on $a/b=1$, but approximate for all other ratios of $a/b$.

(4) From the deflection ratio, knowing $t$, compute the deflection $\Delta$;

(5) Compare the deflection $\Delta$ with the criteria for acceptable deflection; if the deflection is less than criteria, the tile will not deflect, because of stress diaphragm, beyond the acceptable maximum criteria; if $\Delta$ is greater than criteria, the tile will deflect, and the tile must be redesigned by either of the following:

(6–a) Select another thickness $t$, and recalculate 1–5 above; or (6–b) Keep the thickness constant and compute $$\frac{a/(\text{denominator of criteria})}{t}$$

which equals $\Delta/t$;

(6–c) Knowing the deflection ratio, determine the pressure factor, $$\frac{Wc^5}{6EIt}$$

from curve A, FIG. 3;

(6–d) From the pressure factor, knowing W, $c$, E and $t$, calculate I; the minimum moment of inertia;

(6–e) Adjust the moment of inertia of the tile by altering the shape, e.g., to a domed shaped 3-dimensional tile.

The invention may be more fully understood by reference to the following examples.

EXAMPLE I

Using the above limitations but employing average values, the use of conventional deflection theory, assuming a 2 ft. x 2 ft. plate, may be expressed by the following equation:

(A) $\quad \Delta = C(1-\mu^2)(Wb^4/Et^3)$ wherein C in the constant, $$\frac{0.16}{(1+2.4\alpha^3)}$$

$\mu$=Poisson's ratio, 0.3; W is the load in pounds per sq. ft. of unit area, 0.18 pound per square foot (70 grams per square foot of fibrous product and approximately 12 grams of paint); $b$ equals the longer dimension in inches, 24 inches; E is the modulus of elasticity, $40 \times 10^3$; $t$ is the thickness, 1.56 inches ($\frac{5}{32}$ inch, approximately the average of 0.1 and 0.2 inch); and $\alpha$ is $b/a$, where $a$ is the shorter dimension in inches, 24 inches. Solving the equation:

$\Delta = C(1-\mu^2)(Wb^4/Et^3)$
C is as above, $\alpha=1$, and therefore $C=0.047$ $$\Delta = \frac{0.047(1-0.3^2)(0.18 \times 24^4)}{40 \times 10^3 (1.56)^3 \times 144}$$

$\Delta = 0.1172$ inch

This value for deflection is greater than the accepted criteria of $\frac{1}{240}$ of the span, i.e., 0.1 inch. It does, however, give a deflection greater than ½ the thickness and consequently permits stress diaphragm to be invoked. Using the accepted theoretical concepts developed by Rudolph Kaiser as disclosed in the National Aeronautical Council on Acoustics, Report No. 748, 1942, page 362, as set out in the accompanying FIGURE 3, curve A, it is seen that there is a relationship between the deflection/thickness under stress diaphragm conditions and the pressure ratio factor $$\frac{Wc^5}{6EIt}$$

which equals 1.09, and on curve A gives a deflection/thickness of 0.6 or a deflection of 0.09 inch. It is to be noted that this deflection is less than the maximum acceptable or tolerable deflection. It has been proved by actual physical tests that the deflection of a flat 2 ft. x 2 ft. glass fiber panel having the above properties is 0.07–0.08 inch, which supports the theoretical calculation immediately above.

The actual flat panels were tested by cutting the panels into 6 inch x 12 inch samples and testing on a 4 inch span, using center-point loading, for deflection and modulus of elasticity. The surface to be exposed was placed in tension. Thickness averages were determined by mercury displacement. Deflection measurements were obtained for a period of 5 days at 75° F. and 20 to 40 R.H. (relative humidity). The deflection averaged 0.07 to 0.08 inch and the modulus of elasticity between $1 \times 10^4$ and $10 \times 10^4$ with about $4 \times 10^4$ being the average value.

EXAMPLE II

In increasing the span from the normal 2 ft. x 2 ft. as described above, to a 4 ft. x 4 ft., $b$ increases from 24 inches to 48 inches, and since $b$ is expressed as a fourth power (Equation A in Example I above), this increased span results in an increase of 16 in the calculated deflection. Using stress diaphragm theory, the pressure factor, $$\frac{Wc^5}{6EIt}$$

increases by 32 since $a$ also is doubled and $c=a/2$, but by interpolating curve A the deflection increase is restricted to a factor of approximately 4 since $\Delta/t$ is not directly proportional to the pressure factor. Hence as has already been stated, as the deflection increase within the elastic limits, stress diaphragm becomes more of a factor in controlling deflection. Inasmuch as stress diaphragm is invoked, a 4 power increase is calculated for deflection of a 4 ft. x 4 ft. panel rather than a 16 power increase, as computed using Equation A, for a 2 ft. x 2 ft. panel. This again demonstrates the significant benefits achieved for a stress diaphragm action. To reduce this four power increase of deflection to less than the acceptable deflection criteria $a/120$ or in the case of a 4 ft. x 4 ft. panel, 0.2 inch, necessary calculations can be made from the pressure factor $$\frac{Wc^5}{6EIt}$$

By changing the cross sectional shape of the panel and thereby increasing the moment of inertia, by moving more of the area away from the neutral axis, the new pressure factor, can be reduced to overcome the four power increase. Thus for a 4 ft. x 4 ft. panel with a limited maximum deflection of 0.2 inch, $\Delta/t$ must be limited to 0.128 based on a 0.156 inch thickness, and from curve A, the pressure factor must be less than 2.4 This gives a minimum value for I of $1.109^4$ inch. Knowing this, the flat sheet may be shaped to a three-dimensional effect of a dome as illustrated in FIGURES 4 and 4a to provide the minimum moment of inertia. In FIGURES 4 and 4a a panel 10 is illustrated having a peripheral border 12 which may be used to mount the panel in a supported ceiling structure such as is illustrated in FIGURE 6 and a concave or convex shaped majority portion 14 which may be so shaped to provide a three-dimensional effect. As alternatives, the shape could be an inverted dome or the inverted coffer shape illustrated in FIGURES 5 and 5a. In these figures a second embodiment of a panel 20 is shown having a peripheral border 22 which may be utilized in the same manner as border 12 and having a major central portion 24 in the shape of a four-sided truncated pyramid which likewise may be molded as shown in FIGURE 5a, dependent upon the desired effect. While this provides the minimum change in I, other considerations, such as handling, aesthetical appearance, etc., may necesitate greater changes in the shape and consequently the moment. FIGURE 6 illustrates a preferred form of an acoustical tile suspension system 30 consisting of three-dimensionally shaped tiles 40 which may have the shape of the acoustical panel as illustrated in FIGURE 4. The tiles 40 are dependently supported from the ceiling by longitudinal and latitudinal tile supporting T-bars 36.

In the fabrication or manufacture of the acoustical tiles formed from glass fibers in accordance with the instant invention, individual fibers, e.g., "A" to "D" fibers (0.00004–0.00040" diameter) are collected in a mass-like state and a suitable binder material applied to the mat. Thereafter, the mass of binder-impregnated fibers is compressed to the desired density-thickness relationship, shaped, and heated to cure the binder while the mass of fibers is maintained in a compressed condition.

Suitable binders which may be employed are the thermoplastic resins, thermosetting resins such as the phenol formaldehyde, or urea formaldehyde, or if the case permits non-resinous binders such as starches, sugars, and the like, all of which depend upon the environment of the installation in which the surfacing unit or tile is to be used. The binder should be present between 5 and 25% by weight of the mat, with about 8–12% being preferred.

It was determined that the flow resistance was related to the fiber diameter, and the diameter should be controlled between 0.00004 inch and 0.0004 inch with 0.00010–0.00017 being preferred in order to achieve proper flow resistance and acoustical properties.

A further understanding of the invention and particularly the acoustical significance may be obtained by reference to the following additional examples of operations within the scope of this invention. In these examples all parts and percentages are by weight unless otherwise indicated.

For the random incidence which occurs in properly constructed reverberation rooms, theory states that a maximum sound absorption value of 0.95 is obtained when the reactive component of acoustical impedance of the construction is zero and the resistive component is $1.6\rho c$ units. Experience has shown that the resistive component of spaced-out blankets is approximately the same as the flow resistance. The reactive component is predominantly a function of the air space, varying as a cotangent function over a range from zero to infinity as the frequency is varied. If it were possible to obtain accurate results with a pure tone in the reverberation chamber, it would be expected that sound absorption would depend strongly on frequency, particularly if subdividing cells were used in the air space. For several reasons (no subdividers, departure from the normal impedance assumption, nature of the random field, used of a wide-bank test tone excitation) the measured absorption is approximately midway between the peaks and valleys predicted by the simpler approach.

The sound absorption values given herein were on both surfaced, e.g., painted, and unsurfaced materials.

Flow resistance was determined in the standard way. One disc 3.68 inches in diameter was cut from each lot. Where applicable, it was left in the cutter, which served as a holder for the test. Where not applicable a paper collar was formed tightly around the perimeter. With the collar dipping into the water seal of the test apparatus a satisfactory mounting was obtained. Certain discs were coated and were tested again for flow resistance.

Sound absorption test

Method _____ Reverberation chamber, vanes rotating.
Sound source _____ Octave bands of thermal noise.
Condition of pit _____ Filled with water to proper depth.
Sample mounting _____ Furring 1 inch deep by 2 inches wide carried on angles at each end of pit; furring spaced to take the item size; material supported on the furring.

These tests were performed on various materials which are listed below and represent Examples III through IX.

EXAMPLE III

Glass fiber blanket, 24 x 24 inch, and having a nominal thickness of ⅛ inch 12 lb./cu. ft. density, was made by combined layers of uncured resin-impregnated glass fibers having an average diameter between 0.00010 and 0.00015" in a heat mold about 8% resin was used. The mold was closed and a pressure of about 80 lbs. and a temperature between 400° and 500° F. employed. After about a half minute, the press was opened and the edges of the pressed panel trimmed.

EXAMPLE IV

Example III was repeated except to change the thickness nominally to be 3/16".

EXAMPLE V

Example III was again repeated except as to increase the thickness to 1/4".

EXAMPLE VI

Example III was repeated and the mat shaped nominally 5/32 x 24 x 96 inch and 2 inches concave; test (a) before painting; test (b) after painting, with 20 grams per square foot of a fire retardant paint.

EXAMPLE VII

A glass fiber felt 1/4 inch thick and having a density of 4 lbs./cu. ft. was made in accordance with the above-described technique.

EXAMPLE VIII

A flat glass fiber panel with diamond plate pattern, nominally 1/8 x 24 x 48 inch and of a 27 pound density was pressed.

EXAMPLE IX

A two-ply panel, convex and concave 7 inch squares, nominally 1/16 x 24 x 24 inch and of 30 pound density was pressed according to the foregoing technique. The results of the tests on these examples appear below in Table I.

Figure 1:
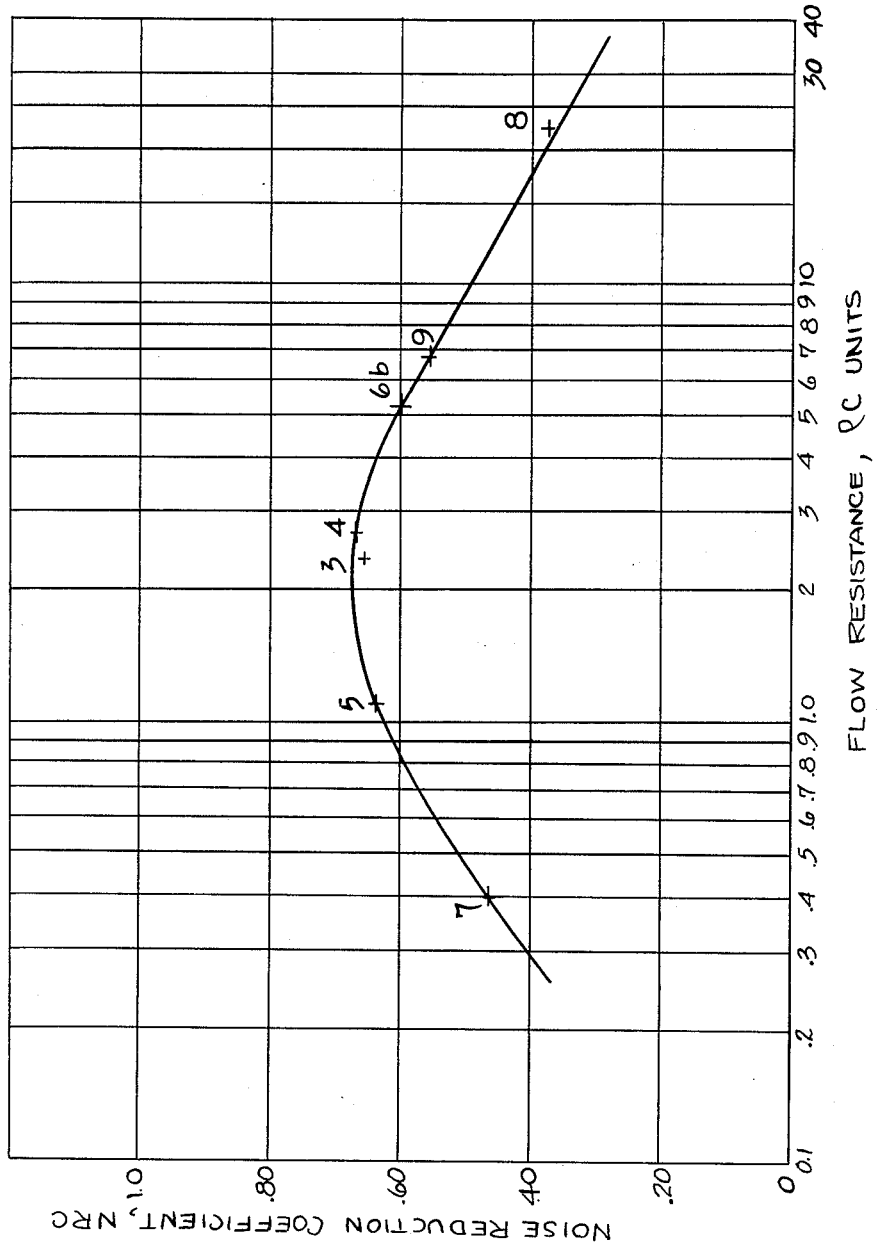
FIGURE 1 is a curve representing the noise reduction coefficient (NRC) for acoustical tiles against the flow resistance, FR, in $\rho c$ units.

FIGURE 1 shows in graph form the noise reduction coefficient (NRC) versus the corresponding flow resistance for these examples. The net effect of the figure is to show the sound absorption as a function of the flow resistance. The graph is a net result expressed as the NRC of the six individual frequencies at 125, 250, 500, 1000, 2000, and 4000.

Example VI–a does not appear, however, it is represented by Example VI–b.

TABLE I

| Example | 3 | 4 | 5 | 6a | 6b | 7 | 8 | 9 |
|---|---|---|---|---|---|---|---|---|
| Test band (frequency): | | | | | | | | |
| 100–200 | .79 | .69 | .73 | .74 | .65 | .60 | .41 | .57 |
| 150–300 | .79 | .77 | .80 | .75 | .69 | .58 | .41 | .58 |
| 200–400 | .73 | .72 | .73 | .75 | .61 | .53 | .40 | .53 |
| 300–600 | .63 | .63 | .58 | .65 | .55 | .43 | .35 | .51 |
| 400–800 | .58 | .55 | .53 | .62 | .54 | .37 | .34 | .51 |
| 600–1200 | .65 | .61 | .60 | .63 | .61 | .43 | .33 | .58 |
| 800–1600 | .68 | .65 | .64 | .65 | .64 | .42 | .38 | .60 |
| 1200–2400 | .63 | .69 | .63 | .65 | .61 | .44 | .39 | .55 |
| 1600–3200 | .66 | .68 | .66 | .66 | .62 | .45 | .42 | .53 |
| 2400–4800 | .60 | .69 | .70 | .72 | .59 | .50 | .42 | .55 |
| 10 band average | .67 | .67 | .66 | .68 | .61 | .48 | .38 | .54 |
| Interpolated values: | | | | | | | | |
| 125 | .79 | .65 | .71 | .74 | .63 | .61 | .41 | .56 |
| 250 | .76 | .74 | .76 | .75 | .64 | .55 | .41 | .55 |
| 500 | .59 | .47 | .54 | .63 | .54 | .39 | .34 | .51 |
| 1000 | .65 | .64 | .63 | .64 | .63 | .43 | .36 | .59 |
| 2000 | .65 | .69 | .64 | .65 | .61 | .45 | .40 | .53 |
| 4000 | .57 | .70 | .72 | .74 | .57 | .51 | .42 | .56 |
| NRC | .66 | .66 | .64 | .67 | .60 | .46 | .38 | .54 |
| Flow resistance: | | | | | | | | |
| Disc wt., p.s.f. | .13 | .16 | .14 | | .27 | .08 | .29 | .16 |
| Disc caliper, in. | .13 | .15 | .19 | | .23 | .25 | .12 | .06 |
| Disc density, p.c.f. | 11.9 | 12.9 | 8.6 | | 13.0 | 4.0 | 27.6 | 30.7 |
| FR unpainted | 2.3 | 2.8 | 1.1 | | | .39 | 22.9 | 6.8 |
| Painted added, g./sq. ft. | 16 | 13 | 16 | | | 16 | 13 | 13 |
| FR painted | 3.0 | 3.5 | 1.4 | | 5.1 | .52 | 24.1 | 8.9 |

The study was continued so as to determine the relationship between the flow resistance and the stock density. Making the assumption that flow resistance is a direct function of thickness, the measured flow resistance for the uncoated disc was converted to flow resistance at 1/8" thickness. The measured increase in flow resistance caused by coating was then added to each of these 1/8" thick normalized values as this is a surface effect independent of the thickness. This may be interpreted as meaning that for a given weight of mat it has the lowest flow resistance when used at the greatest thickness. Table II shows this for certain weights; the effect of any coating on the flow resistance has been included and therefore not considered.

TABLE II

| Blanket weight | | Blanket density, p.c.f. | | | Flow resistance | | |
|---|---|---|---|---|---|---|---|
| g./sq. ft. | lb./sq. ft. | 1/8 in. | 1/4 in. | 3/8 in. | 1/8 in. | 1/4 in. | 3/8 in. |
| 58 | 0.128 | 12.3 | 6.15 | 4.1 | 3.1 | 1.3 | 0.8 |
| 68 | 0.150 | 14.4 | 7.20 | 4.8 | 4.3 | 1.8 | 1.1 |
| 78 | 0.172 | 16.5 | 8.25 | 5.5 | 5.4 | 2.4 | 1.4 |
| 88 | 0.194 | 18.6 | 9.30 | 6.2 | 7.0 | 3.0 | 1.8 |

From this, the flow resistance (FR) of a fibrous mat can be expressed by the formulation:

$$FR = \frac{W^2}{12,800t}$$

It was thereafter determined that the action of the coating on the surface of the mass raised the flow resistance and this is a governing change. For the 12 to 20 grams per square foot of dried solids supplied the increase in flow resistance was least for the lower density and greatest for the higher density. This is believed to be true in part due to the way the coating particles may penetrate the low density materials. With the higher density materials a given amount of coating tends to flow together to block off more of the surface. Arranged in descending order of stock density, Table III presents the relationship between the sound absorption as expressed by flow resistance and the coated surface.

TABLE III

| Example | Density | Unpainted FR | Painted FR | Increase |
|---|---|---|---|---|
| 5 | 8.6 | 1.1 | 1.4 | 0.3 |
| 3 | 11.9 | 2.3 | 3.0 | 0.7 |
| 4 | 12.9 | 2.8 | 3.5 | 0.7 |

In considering the net effect of the coating upon the surface of the fibrous mass it may be seen that to the above formula for calculating the flow resistance of the mat the following value may be added as the increase brought on by the coating. This may be expressed by the following formula: $FR_c = (1/459 W/t)^2$ wherein again W is the surface weight expressed in grams per square foot and $t$ is the thickness expressed in inches.

It was determined that two factors determined the flow resistance. First, it increases as a first power of the thickness for a given density and secondly, it increases as the square of the density for a given thickness. It is therefore seen that the governing equation for the flow resistance of a tile of $t$ thickness is:

$$FR = W^2/12,800t + (1/459W/t)^2$$

Figure 2:
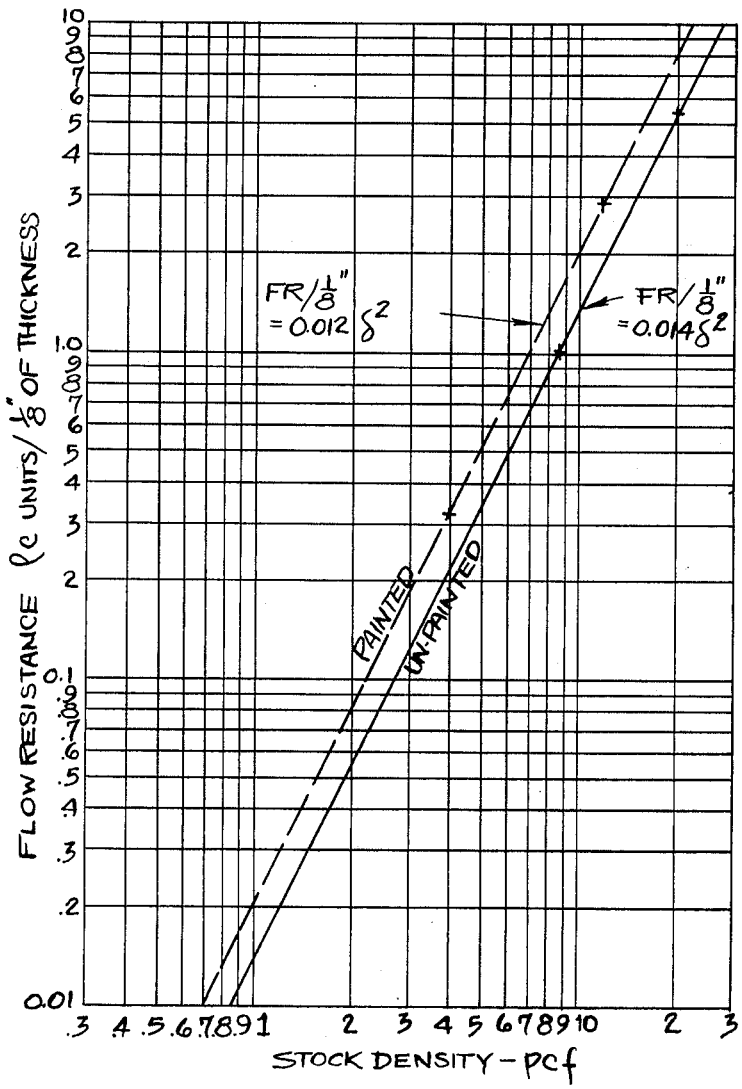
FIGURE 2 is a curve representing flow resistance, FR, for painted and unpainted panels against stock density.

The result of this is depicted in FIGURE 2. As shown by lines C and D, stock densities between about 10 and 15 pounds per cubic foot having an uncoated flow resistance between 1 and 2.8 would provide a flow resistance between a 1.5 and 4 when coated by the instant procedure. As shown by the graph in FIGURE 1, the end points 1.5 and 4 are considered here as important because it is this region that the NRC curve of that graph shows a maximum.

In order to appreciate more clearly the significance of the instant invention it should be kept in mind that comparative data for 8 oz. duck or thin slices of 12 pounds per cubic foot of thick blankets on the order of 0.15 inch thick, have flow resistances of $0.75 \rho c$ units and $0.31 \rho c$ units, respectively, and will not span a normal ceiling distance, e.g., 2 ft. x 2 ft. without objectionable deflection.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What we claim is:

1. An acoustical panel comprising a surfaced glass fiber mat $a$ inches wide and $b$ inches long, said mat having a thickness, $t$, between about 0.1 inch and less than $a/90$, a weight per unit area between 55 and 170 grams per sq. ft., a density between about 10 and about 15 lbs./cu. ft., and a flow resistance, FR, between 0.8 and $5\rho c$ units, said thickness being controlled in conjunction with said weight per unit area to permit stress diaphragm action to be invoked in said panel to control deflection within acceptable criteria.

2. An acoustical panel as defined in claim 1 wherein said weight per unit area is equal to $\sqrt{12,800(t)FR}$.

3. An acoustical panel as defined in claim 1 wherein said glass fibers are randomly arranged and range in diameter between 0.00004 and 0.0004 inch.

4. An acoustical panel as defined in claim 3 wherein the fibers of said glass fiber mat are bonded together at their intersections by a cured resin in an amount between about 5 and about 25% by weight of said mat.

5. An acoustical panel as defined in claim 1 further characterized by being shaped to produce a three-dimensional effect.

6. An acoustical panel as defined in claim 5 wherein the shaping of said panel increases the moment of inertia of said panel to assist in controlling the deflection of said panel within acceptable criteria.

7. An acoustical panel as defined in claim 1 wherein said glass fiber mat has a modulus of elasticity between $1 \times 10^4$ and $10 \times 10^4$ p.s.i.

8. An acoustical panel as defined in claim 1 wherein said fiber glass mat is surfaced with a coating in an amount between about 12 and about 20 grams/sq. ft.

9. An acoustical panel as defined in claim 1 wherein the glass fibers range between 0.00010 and 0.00017 inch in diameter and the panel is between 0.1 and 0.2 inch thick.

10. A supported ceiling structure comprising individual ceiling tiles subject to deflection during use, each of said tiles comprising a surfaced glass fiber mat $a$ inches wide and $b$ inches long, said mat having a thickness, $t$, between about 0.1 inch and less than $a/90$, a weight per unit area between 55 and 170 grams per sq. ft., a density between about 10 and 15 lbs./cu. ft. and a flow resistance FR between 0.8 and $5\rho c$ units, said thickness being controlled in conjunction with said weight per unit area to permit stress diaphragm action to be invoked in said panel to control deflection within acceptable criteria.

11. A supported ceiling structure as defined in claim 10 wherein said tiles are supported in regularly spaced T-bars.

12. A supported ceiling structure as defined in claim 10 wherein said weight per unit area is equal to $\sqrt{12,800(t)FR}$.

13. A supported ceiling structure as defined in claim 10 wherein said glass fibers are randomly arranged and range in diameter between 0.00004 and 0.0004 inch.

14. A supported ceiling structure as defined in claim 13 wherein the fibers of said glass fiber mat are bonded together at their intersections by a cured resin in an amount between about 5 and about 25% by weight of said mat.

15. A supported ceiling structure as defined in claim 10 wherein said acoustical panel is further characterized by being shaped to produce a three-dimensional effect.

16. A supported ceiling structure as defined in claim 15 wherein the shaping of said panel increases the moment of inertia of said panel to assist in controlling the deflection of said panel within acceptable criteria.

17. A supported ceiling structure as defined in claim 10 wherein said glass fiber mat has a modulus of elasticity between $1 \times 10^4$ and $10 \times 10^4$ p.s.i.

18. A supported ceiling structure as defined in claim 10 wherein said fiber glass mat in surface with a coating in an amount between about 12 and about 20 grams/sq. ft.

References Cited by the Examiner

UNITED STATES PATENTS

| | | | |
|---|---|---|---|
| 2,028,180 | 1/1936 | Arnold | 181—33 |
| 2,028,272 | 1/1936 | Burgess | 181—33 |
| 2,994,112 | 8/1961 | Stephens | 181—33 |
| 3,092,203 | 6/1963 | Stayter et al. | 181—33 |

FOREIGN PATENTS

| | | |
|---|---|---|
| 102,914 | 1/1938 | Australia. |
| 1,133,656 | 11/1956 | France. |
| 370,446 | 4/1932 | Great Britain. |
| 811,631 | 4/1959 | Great Britain. |

OTHER REFERENCES

Noise Control, periodical, vol. 2, No. 1, January 1956, pages 15–19 and 72.

LEO SMILOW, *Primary Examiner.*